United States Patent [19]

Lusas et al.

[11] Patent Number: 5,437,885
[45] Date of Patent: Aug. 1, 1995

US005437885A

[54] METHOD OF MAKING A NON-POROUS VEGETABLE PROTEIN FIBER PRODUCT

[75] Inventors: Edmund W. Lusas, Bryan; Gabriel J. Guzman, College Station; Steven C. Doty, Caldwell, all of Tex.

[73] Assignee: Texas A&M University, College Station, Tex.

[21] Appl. No.: 171,753

[22] Filed: Dec. 21, 1993

Related U.S. Application Data

[63] Continuation of Ser. No. 852,835, Mar. 16, 1992, abandoned, which is a continuation of Ser. No. 670,007, Mar. 15, 1991, abandoned.

[51] Int. Cl.⁶ .......................... A23B 9/00; A23P 1/00
[52] U.S. Cl. .................................... 426/302; 426/516; 426/634; 426/641; 426/656; 426/802
[58] Field of Search .............. 426/302, 516, 641, 656, 426/307, 443, 447, 448, 601, 629, 634, 643–647, 652, 657, 802, 810

[56] References Cited

U.S. PATENT DOCUMENTS

| 3,537,859 | 11/1970 | Handy et al. | |
|---|---|---|---|
| 3,852,483 | 12/1974 | Oborsh et al. | 426/646 |
| 3,950,564 | 4/1975 | Puski et al. | |
| 4,031,267 | 6/1977 | Berry et al. | 426/656 |
| 4,042,715 | 8/1977 | Wenger et al. | 426/656 |
| 4,235,935 | 11/1980 | Bone et al. | 426/516 |
| 4,310,558 | 1/1982 | Nahm | 426/635 |
| 4,579,741 | 4/1986 | Hanson et al. | 426/643 |
| 4,910,038 | 3/1990 | Ducharme | 426/641 |

OTHER PUBLICATIONS

Fulmer, R. W., "The preparation and properties of defatted soy flours and their products," Proceedings of the World Conference: Vegetable Protein Utilization in Human Foods and Animal Feedstuffs, T. H. Applewhite, ed., American Oil Chemists' Society, Champaign, Ill., pp. 55–61, (1989).

Beery, K. E., "Preparation of Soy Protein Concentrate Products and Their Application in Food Systems," Proceedings of the World Conference: Vegetable Protein Utilization in Human Foods and Animal Feedstuffs, T. H. Applewhite, ed., American Oil Chemists' Society, Champaign, Ill., pp. 62–55, (1989).

A. M., Pearson and F. W. Tauber, "Processed Meats, Second Edition," Avi Publishing Company, Westport, Conn., pp. 1–17, 87–105, (1984).

N. L. King and J. J. Macfarlane, "Muscle proteins. Advances in Meat Research, vol. 3. Restructured Meat and Poultry Products," Avi Book. Van Nostrand Reinhold Company, N.Y., pp. 21–72, (1987).

Primary Examiner—Donald E. Ozaja
Assistant Examiner—Leslie Wong
Attorney, Agent, or Firm—Cox & Smith Incorporated

[57] ABSTRACT

A method for processing a dehulled, defatted oilseed protein meal, e.g., soybean meal, to produce non-porous, meat-like fibers comprises preparing an oilseed protein source and water mixture, extruding the mixture under predetermined conditions, coating the extruded mixture with an edible oil or fat and then further extruding the oil- or fat-coated fibers under specified conditions. The mixture may further comprise meats, fruits, and/or other vegetables as a source of water. The extrusion conditions and the oil or fat coating act to inhibit the expansion of the extruded, non-spongy fibers. The resulting product has a non-porous texture and resembles broiled meat fibers.

12 Claims, 2 Drawing Sheets

METHOD OF MAKING A NON-POROUS VEGETABLE PROTEIN FIBER PRODUCT

This application is a continuation of application Ser. No. 07/852,835 filed on Mar. 16, 1992, now abandoned, which was a continuation of application Ser. No. 07/670,007, filed on Mar. 15, 1991, now abandoned.

BACKGROUND OF THE INVENTION

1. Field of the Invention

The present invention relates to a method of processing vegetable products to make foodstuffs which simulate animal meat in appearance and texture and flavor when appropriately flavored. More particularly, the method of the invention relies on a modified extrusion cooking-texturization technique for ma king vegetable protein products such as soybean foodstuffs, optionally with various additives which have a fiber-like texture resembling choice cuts of cooked meat.

2. Description of the Background

Cooked meat is the heat-denatured, intact striated muscle of animal, fowl or aquatic species. The essential unit of muscle tissue is a long multinucleate fiber consisting of a cluster of myofibrils which hold a solution of sarcoplasm between them. The fiber is covered by a very thin membrane, the sarcolemma, to which connective tissue is bound on the outside. In turn, the fibers are arranged in parallel bundles to form muscles, which are then formed into a sheath. The muscles are attached to a bone, tendon or other rigid structures in pairs of a major and a minor muscle. When the major muscle contracts the minor muscle relaxes. The minor muscle then contracts returning a relaxed major muscle to its original position, thus permitting the chest muscles and diaphragm to work the lungs, and the legs, wings, fins, or tails to move. This parallel but covered structure permits the muscles, and the fibers within the muscles, to slip by each other while contracting or relaxing.

During cooking, a muscle loses its elasticity due both to denaturation of myofibril proteins and a loss of its ability to hold the sarcoplasmic solution. However, cooked meat retains its basic structure formed of many parallel fibers, each with its individual cover. When meat is chopped, ground, or otherwise reduced to discrete shreds and the mass is reshaped as in making hamburger patties, the shortened muscle shreds are placed in random order but each shred retains its fiber-like substructure. This structure provides a resilient feeling in the mouth when the food is chewed.

Early attempts by the food industry to simulate the fibrous structure of meat, with, e.g., soy protein, developed around a simplified model of natural meat. The model comprises a system involving the manufacture of fibers or sheets of texturized soy protein held together by suitable binders such as edible albumin. When the multilayers are cut into elongated strips, they simulate, in visual appearance, fibrous strands of meat. The technology then developed to extrusion of spongy masses of protein with elongated collapsed air or steam cells, whose ruptured walls give the appearance of aligned fibers.

U.S. Pat. No. 3,950,564 to Puski et al. discloses a modified extrusion method for processing soy protein flour into elongated strands which visually resemble fibrous masses of meat. The emphasis in the Puski et al. patent is primarily directed at the improvement of processed vegetable protein foods to make them visually simulate meat. The single extrusion method of the Puski et al. patent, however, provides a product having a substantially limited texture of meat. Nor do Puski et al texturize by oil- or fat-coating the fibers between two extrusion steps.

U.S. Pat. No. 3,852,483 to Oborsh et al discloses and claims a process of manufacturing a starch-based product that mixes a farinaceous material, a proteinaceous material and water with a glyceryl monostearate starch conditioner in specified proportions, so that the latter will react with starch and bind water thereto. The mixture is then extruded once at high temperature and pressure, and propylene glycol added to the surface of the thus formed particles for preservation purposes prior to fat-coating and heating.

Currently available methods for making vegetable protein meat extenders utilize primarily dehulled, defatted soy flour or a soy protein concentrate. U.S. Pat. Nos. 3,537,859 and 4,031,267 disclose methods of extruding aqueous mixtures of defatted soy flour to produce expanded, soy-based meat substitutes. The emphasis in those methods is on replacing natural meat with a protein-rich, nutritious constituent. The resulting products are soft and porous and the emphasis is on nutrition and not on consistency and texture.

Thus, there is always a need for improved nutritious, protein-rich foodstuffs that resemble the appearance, texture, and taste of meat and can be prepared at a lower cost.

DISCLOSURE OF THE INVENTION

This invention relates to a method of preparing nutritious agglomerated fibers that comprises admixing a dehulled, defatted oilseed protein meal, flour, concentrate or isolate with a source of water in a proportion of about 25 to 80 wt % to 50–20 wt %;

heating the admixture at a temperature in excess of about 218° F.;

extruding the heated admixture through a first area maintained at a pressure of about 200 to 1,500 psig to form extruded fibrils;

coating the fibrils with an edible oil or fat; and extruding the coated fibrils through a second area maintained at a pressure of about 50 to 1,250 psig to form agglomerated fibers.

Also part of this invention are nutritious fibers prepared by the method of the invention described above.

A more complete appreciation of the invention and many of the attendant advantages thereof will be readily perceived as the same becomes better understood by reference to the following detailed description when considered in connection with the following drawings.

Figure 1:
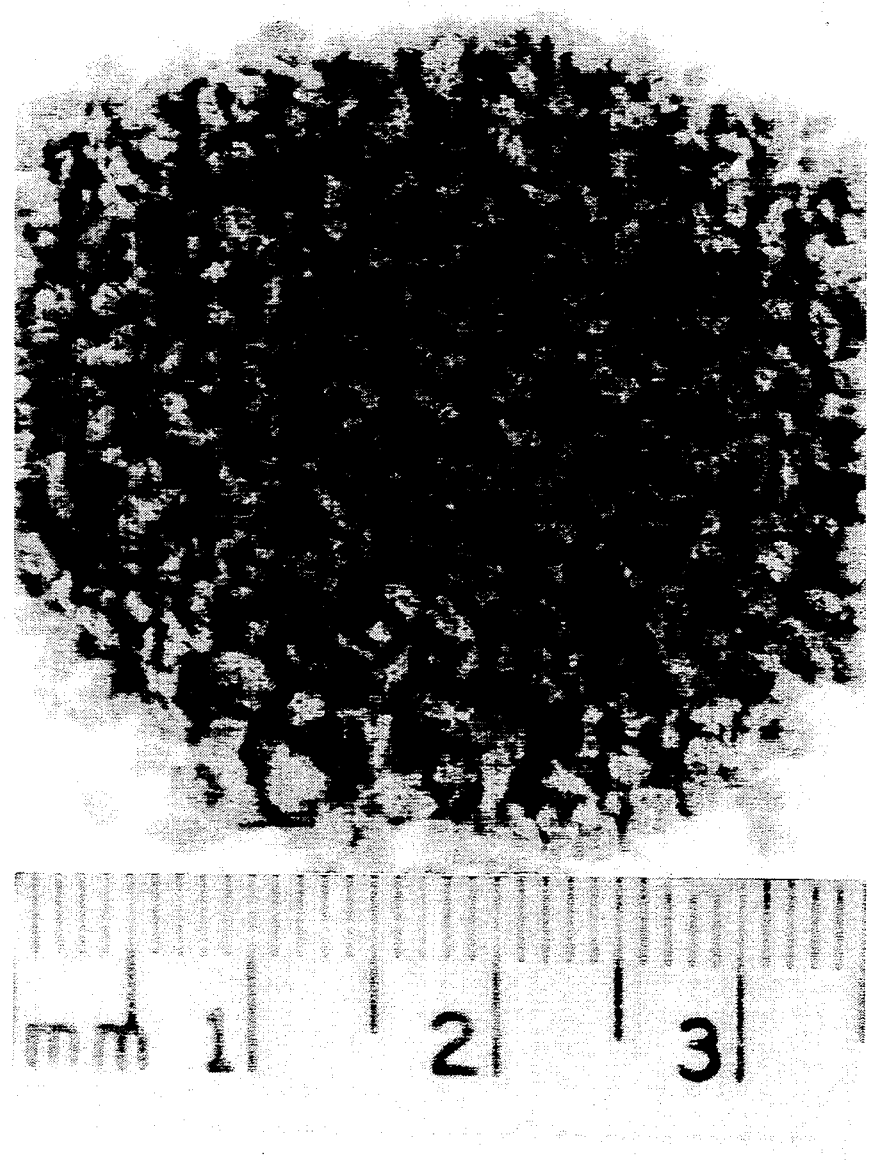
FIG. 1 is a magnified photograph of unoiled fibrils at the end of the first extrusion step conducted in a twin-screw extruder.

Other objects, advantages, and features of the present invention will become apparent to those skilled in the art from the following discussions.

DESCRIPTION OF THE PREFERRED EMBODIMENTS

The dry field bean or *Phaseolus vulgaris* is presently the most widely used legume as a source of non-animal food protein whereas soybean, *Glycine max*, is the most widely used source of extracted oilseed or non-animal protein. A current emphasis by food technologists on the use of the soybean is in utilizing dehulled, ground soy meal and extracted protein preparations as protein-rich meat substitutes. Soybean flours or protein concentrates made from dehulled soybeans contain natural soy fiber which is derived from the parenchyma cell walls of the soybean. This fraction is not present in soybean protein isolates.

Dehulled soy meal is available in several forms. For purposes of this patent, the term "soy flour" refers to dehulled soy meal having an oil content of less than 1%, and which contains in excess of 50% protein by total weight. The term "soy concentrate" refers to a relatively more refined flour-like product with an approximately 70% protein content on a dry weight basis, and "soy protein isolate" refers to an ultra-refined flour-like product that has at least 90% protein content on a dry weight basis. The concentrate does not contain flatulence-producing sugars that are otherwise present in soy flour, and the isolate in addition lacks the natural fiber present in both the concentrate and the flour. Similar names are given to the respective vegetable food proteins derived from other oilseed species, although the protein content for concentrates and isolates of other species may be about 5 to 10% less on a dry weight basis when compared to soybeans.

Typical commercial texturized soy protein consists of an amorphous matrix with elongated air cells that have collapsed so their residual walls give the matrix the appearance of fibers. In contradistinction thereto, the present process produces non-expanded fibers composed of fibrils coated with oil.

Meat protein denatures below 180° F. and loses its ability to bind together other components in later processing steps. Its optional incorporation as an ingredient in the inventive process is intended as a source of flavor, high nutritional quality protein, and water. Meat protein, however, will not enhance the formation of vegetable fibers, e.g., soy protein-based fibers, which occurs well above a temperature of about 212° F. In a preferred embodiment, the meat and meat by-products utilized herein are fresh. However, frozen red meats and meat by-products, poultry flesh, fish and seafood, as well as other vegetables may be used as protein and flavor sources.

The consistency of natural meat is simulated in the present invention by making fibrils by extrusion and coating them with an edible oil soon thereafter so they will not recongeal into a nondescript mass when aggregated into fibers in subsequent extrusion steps.

The method of the present invention converts dehulled, defatted oilseed protein sources such as soybeans and other oilseeds such as rape seed, cotton seed, peanuts, and sunflower seed into a processed foodstuff with a fibrous structure that simulates the appearance, texture, and taste of various types of meat. The method comprises preparing a mixture of the oilseed protein source and a moisture source, optionally from the group of meat, meat trimmings or meat by-products, feeding the mixture into a cooking-texturizing extruder, and bathing or spraying the resulting fibrils with an edible oil, optionally under pressure, e.g., within the extruder. Pre-set reaction conditions within the extruder combined with the addition of oil or fat after the first extrusion permit coating and absorption of the oil or fat into the fibrils. This acts to inhibit the expansion of the fibrils in the second extrusion step. The product resulting from this modified extrusion process has a non-porous texture and resembles fibrous, broiled meat. In one preferred embodiment, a first extrusion of the oilseed material is followed by an addition of oil or fat and a second extrusion of the oil or fat-coated fibers in the same extruder.

The steps of the present process include forming a mixture of a dehulled, defatted oilseed protein meal, flour, protein concentrate and/or isolate and a water source, optionally containing animal meat, feeding the mixture into an extruder, and bathing the mixture, e.g., within the extruder, with an edible oil or fat under pressure. The oil or fat are absorbed into the mixture, e.g., in the extruder. This treatment inhibits the expansion of the product and prevents the appearance of a porous, sponge-like structure.

One extruder with two operations in one extruder barrel may be used to prepare the product of the invention. Alternatively, consecutive extruders may be used as long as the oil or fat is added before the second extrusion step to impart a glistening appearance to the final fiber product. However, on exiting the first extruder, the fibrils will be congealed together, and it may be necessary to reduce their size by cutting, grinding or shredding using appropriate machinery. The product resulting from the modified extrusion process of the invention has a non-porous texture and resembles fibrous meat.

The source of water may comprise meats, meat by-products, fruits, vegetables or water alone.

The fibrous oilseed protein product may be combined later with other ingredients such as ground meat, and may be colored and flavored as desired. The fibers normally leave the extruder in clumps that resemble broiled meat, but may be shredded later if desired for other culinary applications.

The method of the present invention produces a meat substitute which not only visually, but also texturally, resembles meat fibers. Its taste resembles actual shredded meat, particularly if a significant portion of the extrusion mixture is meat, or if appropriately flavored. One reason for this improvement is the formation of fibrils whose integrity is assured by bathing the fibrils forming the fibers in oil or fat or spraying of oil or fat onto them to avoid their recongealing together. The cooked fibers without added color, look like shredded breast of chicken or crab meat. When colored red, the fibers glisten like raw meat in the moisture range of intermediate moisture foods (IMF). When colored tan, the fibers look like broiled or roasted meat in the IMF moisture range. Color agents that are safe for use in foodstuffs are known in the art, and need not be further described herein.

As already indicated, the present process comprises various steps. A mixture is prepared of a dehulled, defatted oilseed protein source such as a defatted soy meal, flour, protein concentrate and/or protein isolate, the mixture is moistened to about 20–50 wt% water content, either by addition of water or materials containing moisture, such as fresh red meat, meat by-products, poultry muscle, deboned meats and poultry, fish, edible parts of aquatic species like scallops, shrimp, carb, shark, turtle,-or fish. The mixture may contain about 25 to 80 wt % oilseed protein source such as soy protein, on a dry weight basis. Other materials such as vegetables and/or fruits may also be utilized as moisture or flavor sources. The vegetable may be a dehulled defatted oilseed meal, flour protein, protein concentrate, and/or a protein isolate. These may be prepared as is known in the art from seeds such as those of soy bean, rape seed, cottonseed, nuts, and the like and/or mixtures thereof (Fulmer, R. W., "The Prep. and Properties of Defatted Soy Flours and their Products", in Proc. World Congr. on Veg. Prot. Utilization in Human Foods and Animal Feedstuffs, Applewhite, T. H., ed., Amer. Oil Chem. Soc., Champain, IL., pp. 55–62 (1989); Beery, K. E., "Prep. Soy Prot. Concentr. Prod. and Appl. in Food Systems", Ibid, pp. 62–65; Johnson, D. W. and Kikuchi, S., "Proc. for Prod. Soy Prot. Isolate", Ibid, pp. 66–77).

In one preferred embodiment of the invention, the oilseed source utilized in the present method is defatted soy meal, flour and/or protein concentrate. The preparation of defatted meals, flours, protein concentrates, and/or protein isolates is also known in the art.

A broad range of conditions for extrusion and of design variations in commercial extruders are suitable for use herein. The appropriate feed rate arid revolution speed depend on the design of the extruder and the diameter of its barrel. For Wenger Manufacturing Company X-20 and TX-52 extruders, preferred feed rates are about 100 to 500 lb/hr, while the admixture is compressed and sheared in a spiral movement at about 50 to 500 rpm, and more preferably about 250 to 400 rpm. Other conditions for the extrusion may also be utilized as long as they are not detrimental to the final texture, taste, and appearance of the fibers.

The meats, vegetables, and/or fruits added to the initial admixture may be fresh, frozen, and/or dried. However, if dried materials are used, moisture to compensate must be added as water or other high moisture content components.

The meat, meat by-products, fruits and/or vegetables may be added in an amount about 0 to 60 wt %, and more preferably at about 20 to 50 wt % of the admixture.

Among the meats preferred are non-rendered fresh meats and dehydrated meats. The technology for preparing these meats is known in the art and need not be further described herein (Pearson, A. M., and Tauber, F. W., Processed Meats, 2nd Ed, AVI Publishing Co., Inc., Westpoint, Conn. (1984)).

Additives like animal flesh, and/or emulsifiers, cereal components and starch, edulcorants such as corn sweeteners, sugars and artificial sweeteners, sorbitol, polyalcohols such as glycerine, alkylene glycols, salts, colorings, sources of dietary fiber and other ingredients may be added to the extent that they do not interfere with the production of a continuous phase vegetable protein fibrils, such as a soy protein fibrils, during the first extrusion step. Examples of emulsifiers are lecithins and derivatives thereof, among others. Examples of cereals are wheat, corn and oats, among others. Examples of flavorings are salt, sugar, citric or phosphoric acid, ground pepper and other spices, extracts of natural flavorings like liquid smoke and oleo resins of pepper and spices and compounded flavorings. Examples of polyalcohols are glycerol, propylene glycol, butanediols, mannitol, sorbitol, and xylitol. Examples of colorings are edible colorings such as caramel color, paprika and FD&C certified water-soluble colorants and alumina lakes of these colorants, among others. Examples of fibers are soy hulls and parenchyma cell residues, oatmeal, corn fiber and rice bran, among others. Other ingredients may also be added as is known in the art.

Any fat accompanying the ingredients is acceptable, provided it is present in an amount that does not interfere with formation of tile fibers. Typically, an amount of about 0 to 0.1 g fat/g admixture, and more preferably about 0.01 to 0.06 g fat/g admixture, is acceptable. Amounts of animal fat about 0 to 7 wt % of the admixture are acceptable in most cases. However, certain types of fat may be incorporated in higher or lower amounts.

As already indicated, this process includes the use of fresh meats and meat by-products, with "fresh" meaning non-rendered or dehydrated meats and meat by-products, although the meats or meat by-products may have been previously frozen.

Figure 2:
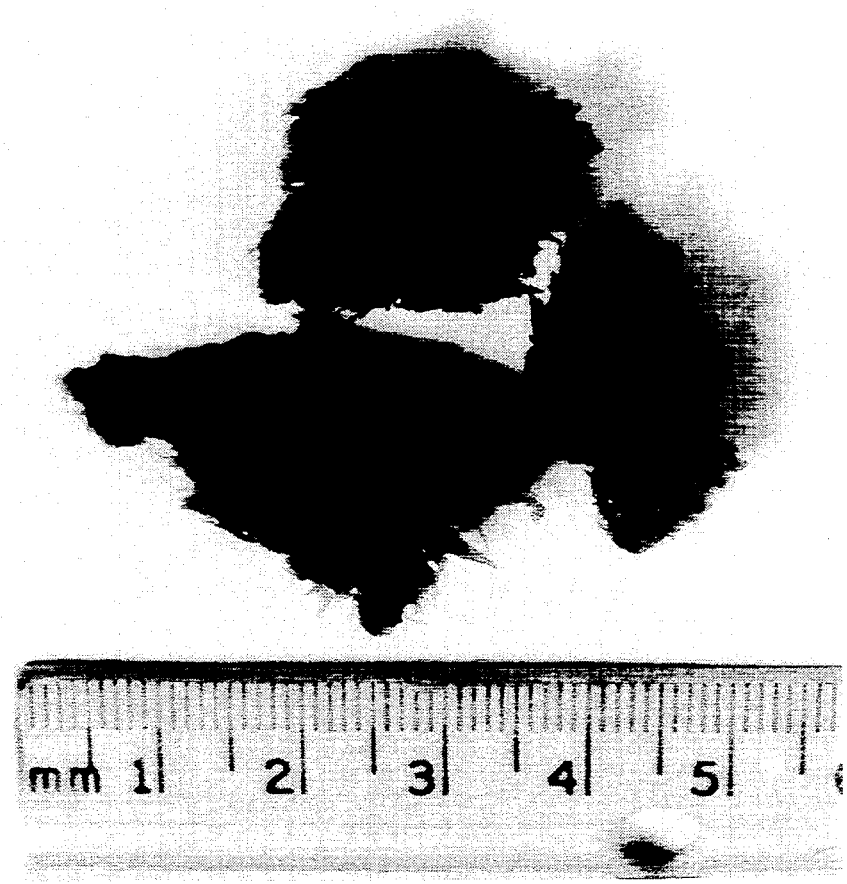
FIG. 2 is a magnified photograph of oiled fibers at the end of the second extrusion step in a twin-screw extruder.

When extruded, the mixture is compressed, heated, sheared, and forced around torturous impediments in the screw to emerge as fibrils from an area of high pressure into an area of reduced pressured containing a pool or spray of oil. Extruded, uncoated fibrils are shown in FIG. 1 whereas agglomerated oil-coated fibers are shown in FIG. 2. The latter fibers have been through two extrusion steps as described below.

During extrusion, the admixture is heated at a temperature that is preferably in excess of about 218° F. In general, the admixture may be heated and kept at a temperature of about 200° to 350° F., and more preferably about 210° to 250° F. In this temperature range, the protein in the admixture is denatured as the admixture is heated above about 180° F., and, with sufficient working, the globulin protein molecules from the defatted pilseed protein source unfold into their linear configurations, or fibrils, and become aligned in parallel structures.

The extrusion step is conducted at the above-stated temperature with sufficient mixing to align the protein under a gradient of pressures. In the first area, the pressure of the admixture is raised from about 0 to about 1,500 psig, and more preferably from about ambient temperature to about 500 to 1,250 psig. In a second area, after the first extrusion step and before the second extrusion step, the pressure may be raised from about 0 to 1,250 psig, and more preferably from about 0 to 500 psig. The unfolded, aligned molecules of oilseed globular protein would normally form a hard mass unless they are forced to separate or blow apart by a sudden release of pressure. The force that separates them is the steam resulting from superheated water that can expand on release of pressure. Ruptures occur at the site of irregularities or inert foreign materials between the aligned protein fibrils. When extrusion is conducted with a twin-screw extruder, it is not essential that the pressure return to ambient (0 psig). For example, expansion may occur by a sudden release of pressure from about 1,000–1,500 psig to about 500 psig. In this process, optionally, the pressure may be further reduced to about 0 psig before applying the oil or fat coat, and repressurizing the product to force the particles to adhere together, and again be blown apart upon exiting the second extrusion die.

If made entirely in one extruder, the fibrils are mixed with the oil or fat, preferably still under slight pressure, as they are conveyed by the screws to be recompacted, and extruded a second time to pass through a die, e.g., in laminar flow. As an alternative, the fibers may be allowed to emerge from a first extruder, the oil or fat applied onto them, and the mixture then reextruded a second time.

The oil or fat coating step is preferably conducted at a pressure of about 50 to 1,000 psig, and more preferably about 50 to 200 psig. This, as already indicated, may be done within the extruder or as the fibrils emerge therefrom. In the case that two or more consecutive extrusion steps are conducted, the oil or fat coating may be conducted at the end of the first extrusion step or during the second extrusion step prior to the emergence of the fibrils from the extruder and/or their compacting. The coating step may be conducted by bathing the fibrils in an oil or fat bath or by spraying.

The extrusion step may typically be practiced with a single-screw extruder, twin-screw extruder or combination thereof, utilizing selected screw, barrel and/or dye configurations in accordance with this invention.

The edible oil or fat utilized for coating the fibers in general comprises an oil or fat that is in liquid form, preferably at a temperature about 70° F. or higher. The extrusion steps may be conducted in one extruder or in separate extruders as suitable for each individual preparation. The oil or fat may be coated onto the fibrils preferably after the first extrusion step. In another embodiment, the method of the invention further comprises extruding the oil or fat coated fibrils at a temperature of about 200° to 300° F., and more preferably about 215° to 235° F. and a pressure of about 50 to 1,500 psig, and more preferably about 200 to 700 psig. The second extrusion step forces the oiled fibrils to cluster into fibers which exit as mass puffs from the extrusion die.

The method of the invention may further comprise dehydrating the oil or fat coated fibers, e.g., by drying off excess water. This is done utilizing technology known in the art such as batch or continuous belt driers, by entrainment in hot moving air, or by heating in a microwave oven, among others.

The dehydrated fibers evidence a prolonged shelf life and are therefore, more suitable for commercial purposes. In addition, the intermediate moisture or dehydrated fibrous product of the invention may be further subjected to shredding and/or other mechanical treatments to make them more suitable as ingredients for the different products described below. In general, the mechanical treatments given the fibrous products are known in the art and need not be further described herein. Examples of these are cutting, shredding, slicing, hammer milling and grinding, among others. These, in general, tend to change the grain size of the fibers and therefore make them easier to mix with other ingredients and/or to dehydrate as desired.

The fibers produced by the present invention have a glistening appearance, closely resembling meat fibers. Coloring materials are preferentially added before extrusion. Salt, sugars, acids, spices, smoke and fruit-like flavors, antioxidants to protect the fat against oxidation, and plasticizing materials such as sugar, corn syrups, glycerol, sorbitol, and antimicrobial preservatives like potassium sorbate and propylene glycol that are volatile/heat labile are preferably added after extrusion.

Thus, part of the invention is a nutritious fibrous foodstuff that comprises fibers prepared by the method of the invention and further wrapping the fibers to minimize their exposure to oxygen and moisture.

Having now generally described this invention, the same will be better understood by reference to certain specific examples, which are included herein for purposes of illustration only and are not intended to be limiting of the invention nor any embodiment thereof, unless so specified.

EXAMPLES Example 1

Preparation of Non-porous Fibers from Soybean Flour with Twin-screw Extruder

TABLE 1

| Ingredients Utilized | |
|---|---|
| Ingredients | Amount (lbs) |
| 200/70 soy flour (Cargill, Inc.) | 79.00 |
| Water | 14.00 |
| Refined cottonseed oil (Lou Anna Foods Co.) | 7.00 |
| Total | 100.00 |

Commercially defatted, dehulled soybean flour ground to pass a U.S. 200 mesh sieve when purchased, was mixed continuously with sufficient water to bring the moisture content to 30%. The mixture was fed continuously into a Wenger TX-52 twin screw extruder equipped with a barrel 8 ½ sections long and a set of screws assembled from shafts and worm segments, mixing lobe and ring-type (washer) shearlock elements, recommended by the manufacturer for texturing soy protein part-way through the barrel. The ring shearlock was placed just at the entry to barrel section 6 (counted as the product flows from the inlet to the discharge die). The formation of small fibrils was demonstrated by placing a series of full-pitch screw elements to take the fibrils away as rapidly as possible from the ring-type shearlock and without additional compaction. A picture of the resulting fibrils is shown in FIG. 1.

The extruder was than stopped and tile screw configuration down stream from the shearlock was replaced with a combination of ¾ and ½ pitch screw elements to compact the fibrils and force them through a peripheral die that was installed to create back pressure on the product. The extruder was started again and cottonseed oil was pumped into the extruder cavity after the shearlock under a pressure of 150 psi. The fibrils exiting the shearlock were mixed with oil by the twin screws immediately after exiting the shearlock, and were rapidly conveyed and forced through a peripheral die with ⅜ in. square holes. In this one-pass operation, where the fibrils and oiled fibers were made consecutively on the same twin-screw extruder, the temperature of the fibrils was above 212° F. after passing through the shearlock rings. The pressure prior to the fibril-forming shearlock rings was 1,000 psi. and was reduced to under 150 psi. after passage therethrough. The pressure before the exit die was 650 psi., cooling water was applied to the last two and a half sections of the barrel, and the product exit temperature was 218° F. shortly before exit. The twin-screw extruder was operating at 360 rpm. A picture of the resulting oiled fibers is shown in FIG. 2.

The non-porous tan fibers glistened and looked like shredded roast beef and could be used directly for the manufacture of formulated products or dried. On soaking in water, the fibers looked like shredded breast of chicken or crab meat. On cooking, the fibers had a rubbery texture resembling crab meat or the whites of hard-boiled eggs.

Example 2

Preparation of Oiled Fibers from Soybean Flour and Beef by Twin-Screw and Single-Screw Extrusion

TABLE 2

| Formula | Ingredients Used<br>Amount (lbs) |
|---|---|
| 200/70 soy flour (Cargill, Inc) | 63.58 |
| 95% lean beef | 30.30 |
| Red No. 40 alumina lake color (Colorcon, Inc.) | .12 |
| Refined cottonseed oil (Lou Anna Foods Co.) | 6.00 |

Sufficient meat was used to process the product at moisture. Beef clod, trimmed to approximately 95% lean, was passed through a 3/16 in. grinder plate and placed in a silent cutter ("bowl chop") with the color, and was chopped until a coarse homogenate was produced. A continuous commercial emulsifying machine, as used for making sausages, may also be used to fine-grind the meat after pre-mixing with the color. The contents of the silent cutter bowl were added to the defatted commercial soy flour and mixed in an Hobart upright mixer used for mixing bakery doughs. A Wenger TX-52 twin-screw extruder was configured as described earlier to make fibrils part-way through the barrel. The screw and barrel were configured to rapidly move fibrils from the forming ring shearlocks out of the barrel to obtain a sample and for additional processing.

The fibrils were collected, mixed with oil in an Hobart upright mixer, and the product was then passed through a Wenger X-20 extruder configured for making texturized soy protein. This product was red in color, glistened in appearance, and looked like shredded, nitrite-cured beef jerky.

Example 3

Preparation of Oil-coated Fibers from Soybean Protein Concentrate Encompassing two Passes Through Single-Screw Extruder

TABLE 3

| Formula | Ingredients Used<br>Amount (lbs) |
|---|---|
| Soy concentrate Promosoy 100 ™ (Central Soya Co.) | 71.40 |
| Water | 21.00 |
| Refined cottonseed oil (Lou Anna Foods Co.) | 6.00 |
| Bordon beef extract (Sampco Inc.) | 1.00 |
| P-330 caramel color (Sethness Co.) | .60 |
| Total | 100.00 |

The caramel color and concentrated beef extract were dissolved in water, and the solution was blended with the soy concentrate in a Hobart upright mixer. The mixture was extruded through a Wenget X-20 single-screw extruder with the screw and barrel configured to produce fibrils. The fibrils then were mixed with oil, and the mixture extruded a second time to produce oiled fibers. The product was brown and glistened. It had the appearance of a shredded-end cut of roast beef, and a natural beef flavor.

Example 4

Preparation of Oiled Fibers From Soy Protein Concentrate, Beef and Various Ingredients-Twin-Screw Extrusion

TABLE 4

| Formula | Ingredients Used<br>Amount (lbs) |
|---|---|
| Promosoy 100 Soy concentrate (Central Soy Co.) | 42.90 |
| Beef, 95% lean | 38.50 |
| Fibrim Soy fiber (Protein Technologies, Inc.) | 10.00 |
| Refined cottonseed oil (Lou Anna Foods Co.) | 6.00 |
| Beef Extract (Sampco Inc. Bordon) | 1.00 |
| Caramel color (Sethness Co. P-330) | .60 |
| Salt (Morton Salt Co.) | 1.00 |
| Total | 100.00 |

The soy concentrate and soy fiber (75% dietary fiber content) were mixed dry in a Hobart upright mixer. Beef clod, trimmed to approximately 95% lean, was passed through a 3/16 in. grinder plate and then placed in a silent cutter. The beef hydrolyzate and caramel color were added and the mixture chopped to obtain a fine texture. The content of the silent cutter bowl was then added to the soy concentrate and fiber, and the materials mixed uniformly.

The mixture was fed into a Wenger TX-52 twin-screw extruder equipped with an 8½ section-barrel and a set of screws assembled from a shaft and worm segments, mixing lobe and ring-type (washer) shearlock elements, recommended by the extruder manufacturer for texturing soy protein part-way though the barrel. The ring shearlock was placed just at the entry to barrel section 6 (counted as the product flows from the inlet to the discharge die).

A sample of the fibrils was obtained by placing a series of full-pitch screw elements to take the fibrils away as rapidly as possible and without additional compaction.

The extruder was then stopped, and the screw configuration changed to compact the fibrils and force them through a die which induces back pressure on the product. The extruder was started again, and cottonseed oil pumped into the extruder cavity after the shearlock under a pressure of 150 psig. The fibrils exiting the shearlock were mixed with oil by the twin screws immediately after exiting the shearlock, and were rapidly conveyed and then forced through a flat plate face die to exit as agglomerated fibers.

This product had a glistening brown appearance similar to a shredded end cut of roast beef and the flavor of roast beef. It also had approximately 17% dietary fiber on a dry weight basis, and could potentially be used as a dietary fiber source in formulated foods.

The invention having been fully described, it will be apparent to one of ordinary skill in the art that many alternatives, variations, and modifications may be made thereto. Those alternatives, variations and modifications are intended to fall within the spirit and scope of the appended claims.

We claim:

1. A method of preparing nutritious agglomerated fibers resembling meat, comprising:

a) admixing ingredients consisting essentially of i) a dehulled, defatted, oilseed protein meal in a form selected from a group consisting of flour, concentrate and isolate; ii) a source of water selected from the group consisting of meat, meat trimmings, meat by-products, poultry, seafood, and water; and iii) an edible ingredient selected from the group consisting of emulsifiers, sweeteners, flavorings, salt, colorings, soy fiber, fat, and combinations thereof, the edible ingredient being in an amount which does not interfere with the extruding step c) and is not detrimental to the fibers' taste and appearance, to obtain an admixture having a protein content of about 25–80 wt % and a water content of about 50–20 wt %;

b) heating the admixture at a temperature of about 200° to 350° F.;

c) extruding the heated admixture from a first area maintained at a pressure of about 500–1500 psig to a second area of lower pressure to obtain extruded protein fibrils disposed in generally parallel relationship;

d) coating the once extruded fibrils with a liquid edible oil or fat under pressure above atmospheric pressure; and e) extruding the coated fibrils from an area maintained at a pressure of about 50 to 1500 psig to an area of lower pressure to force the oiled fibrils to cluster into non-porous oil coated fibers having a glistening appearance similar to meat fibers.

2. The method of claim 1, wherein
the offseed in the dehulled, defatted, oilseed protein meal is selected from the group consisting of soybean, rapeseed, canola, cottonseed, peanuts, sunflower seed and mixtures thereof.

3. The method of claim 1, wherein the source of water is selected from the group consisting of red meat, poultry, and seafood.

4. The method of claim 1, wherein
the source of water is selected from the group consisting of non-rendered fresh meats and dehydrated meats that are first rehydrated.

5. The method of claim 1, wherein
the edible oil or fat coating the fibrils comprises an oil or fat that is in liquid form at about 70° F. or higher.

6. The method of claim 5, wherein
the oil is selected from the group consisting of soybean oil, cottonseed oil, sunflower seed oil, peanut oil, rapeseed oil, canola off, sesame off, safflower oil, palm off, palm kernel oil, coconut oil, cocoa butter, tallow, lard, chicken fat and turkey fat.

7. The method of claim 1, wherein
the coating step d) is conducted by spraying or bathing the extruded fibrils with the oil or fat.

8. The method of claim 1, wherein
the oil or fat coated fibrils are extruded in step e) at a temperature of about 200° to 300° F. and a pressure of about 50 to 1,250 psig.

9. The method of claim 1, further comprising
compacting the fibers extruded in step e) into a laminar structure.

10. The method of claim 1, wherein
the extrusion steps c) and e) are conducted in one extruder.

11. The method of claim 1, wherein
the extrusion steps c) and e) are conducted in separate extruders.

12. The method of claim 1, further comprising
dehydrating the coated fibers extruded in step e).

* * * * *